(12) United States Patent
Pasterczyk et al.

(10) Patent No.: US 11,588,393 B2
(45) Date of Patent: Feb. 21, 2023

(54) INTERLEAVED PARALLEL INVERTERS WITH INTEGRATED FILTER INDUCTOR AND INTERPHASE TRANSFORMER

(71) Applicants: SCHNEIDER ELECTRIC SOLAR INVERTERS USA, INC., Livermore, CA (US); SCHNEIDER ELECTRIC IT FRANCE, Rueil Malmaison (FR)

(72) Inventors: Robert Pasterczyk, Froges (FR); Jason Elliott, Delta (CA); Zbigniew Wolanski, Burnaby (CA); Benjamin Wun Wang Tam, Vancouver (CA)

(73) Assignee: SCHNEIDER ELECTRIC SOLAR INVERTERS USA, INC., Livermore, CA (US)

( * ) Notice: Subject to any disclaimer, the term of this patent is extended or adjusted under 35 U.S.C. 154(b) by 0 days.

(21) Appl. No.: 17/381,984

(22) Filed: Jul. 21, 2021

(65) Prior Publication Data

US 2021/0359619 A1   Nov. 18, 2021

Related U.S. Application Data

(63) Continuation of application No. 16/943,501, filed on Jul. 30, 2020, now abandoned, which is a
(Continued)

(51) Int. Cl.
*H02M 1/00* (2006.01)
*H02M 1/12* (2006.01)
*H02M 7/49* (2007.01)

(52) U.S. Cl.
CPC ......... *H02M 1/126* (2013.01); *H02M 1/0061* (2013.01); *H02M 1/007* (2021.05);
(Continued)

(58) Field of Classification Search
CPC .. H02M 1/0043; H02M 1/007; H02M 1/0074; H02M 1/0077; H02M 1/12; H02M 1/126
(Continued)

(56) References Cited

U.S. PATENT DOCUMENTS 5,657,217 A   8/1997   Watanabe et al.
7,046,527 B2   5/2006   West
(Continued)

FOREIGN PATENT DOCUMENTS

DE   102007063434 A1 *   1/2009   ............. H02M 7/49
DE   102007063434 A1   1/2009
(Continued)

OTHER PUBLICATIONS

Australian Examination Report No. 1 from corresponding Australian Application No. 2017362229 dated Mar. 6, 2020.
(Continued)

*Primary Examiner* — Gary A Nash
(74) *Attorney, Agent, or Firm* — Lando & Anastasi, LLP

(57) ABSTRACT

A power electronics system, comprising a first inverter configured to receive DC power from a power source and a second inverter configured to receive DC power from the power source is provided. The system includes a first output inductor connected in series to an output of the first inverter, a second output inductor connected in series to an output of the second inverter, a coupling inductor configured to receive current from the first output inductor and the second output inductor, and an AC power output.

16 Claims, 11 Drawing Sheets

Related U.S. Application Data continuation of application No. 16/461,245, filed as application No. PCT/US2017/061727 on Nov. 15, 2017, now abandoned.

(60) Provisional application No. 62/422,838, filed on Nov. 16, 2016.

(52) U.S. Cl.
CPC ........ *H02M 1/0043* (2021.05); *H02M 1/0064* (2021.05); *H02M 1/0074* (2021.05); *H02M 1/0077* (2021.05); *H02M 7/49* (2013.01)

(58) Field of Classification Search
USPC .............................................. 363/37, 40, 71
See application file for complete search history.

(56) References Cited

U.S. PATENT DOCUMENTS

| | | | |
|---|---|---|---|
| 7,990,098 | B2 | 8/2011 | Perisic et al. |
| 2004/0223348 | A1* | 11/2004 | West ................. H02M 7/53875 363/39 |
| 2006/0043922 | A1 | 3/2006 | Baker et al. |
| 2006/0114623 | A1 | 6/2006 | Domoto et al. |
| 2009/0289751 | A1 | 11/2009 | Nagano et al. |
| 2012/0113695 | A1 | 5/2012 | Chivite Zabalza et al. |
| 2013/0229836 | A1* | 9/2013 | Wang ................. H02M 7/4837 363/40 |
| 2014/0152413 | A1* | 6/2014 | Fu ........................... H01F 41/06 336/192 |
| 2015/0349626 | A1 | 12/2015 | Jiang et al. |
| 2016/0329705 | A1 | 11/2016 | Lacaux et al. |

FOREIGN PATENT DOCUMENTS

| | | | | |
|---|---|---|---|---|
| EP | 2536018 | A1 | 12/2012 | |
| WO | 2009132427 | A1 | 11/2009 | |
| WO | WO-2009132427 | A1 * | 11/2009 | ............ H02M 7/487 |
| WO | 2012074311 | A2 | 6/2012 | |
| WO | WO-2012074311 | A2 * | 6/2012 | ............. H02J 3/386 |
| WO | 2013174420 | A1 | 11/2013 | |
| WO | WO-2013174420 | A1 * | 11/2013 | ............ H02M 7/483 |

OTHER PUBLICATIONS

De Mango et al: "Overview of Anti-Islanding Algorithms for PV Systems. Part II: Active Methods", Power Electronics and Motion Control Conference, 2006. EPE-PEMC 2006. 12th International, IEEE, Piscataway, NJ, USA, Aug. 30, 2006 (Aug. 30, 2006), pp. 1884-1889, ,XP031421898, ISBN: 978-1-42440121-5, Section III, A., B.; p. 1885.

Notification of Transmittal of the International Search Report and the Written Opinion of the International Searching Authority from corresponding PCT/US2017/061727 dated Apr. 18, 2018.

European Examination Report from corresponding European Application No. 17808696.3 dated Jul. 27, 2022.

* cited by examiner

INTERLEAVED PARALLEL INVERTERS WITH INTEGRATED FILTER INDUCTOR AND INTERPHASE TRANSFORMER

CROSS-REFERENCE TO RELATED APPLICATIONS

This application is a continuation of U.S. patent application Ser. No. 16/943,501, titled INTERLEAVED PARALLEL INVERTERS WITH INTEGRATED FILTER INDUCTOR AND INTERPHASE TRANSFORMER, which is a continuation of U.S. patent application Ser. No. 16/461,245, titled INTERLEAVED PARALLEL INVERTERS WITH INTEGRATED FILTER INDUCTOR AND INTERPHASE TRANSFORMER, which is a U.S. National Phase Application under 35 U.S.C. § 371 of International Application No. PCT/US2017/061727, titled INTERLEAVED PARALLEL INVERTERS WITH INTEGRATED FILTER INDUCTOR AND INTERPHASE TRANSFORMER, filed Nov. 15, 2017, which claims the benefit of an earlier filing date under 35 U.S.C. § 119(e) and claims the benefit of priority under PCT Article 8, as applicable, of U.S. Provisional Patent Application No. 62/422,838. titled COMPACT AC FILTER MODULE FOR INTERLEAVED POWER CONVERTER, filed on Nov. 16, 2016, all of which are hereby incorporated by reference in their entireties for all purposes.

BACKGROUND

Field of Invention

Embodiments of the present invention relate generally to utility scale power inverters.

Discussion of Related Art

A power inverter, or inverter. is an electronic device or circuitry that converts direct current (DC) to alternating current (AC). Inverters may be used in a number of different contexts, with different DC power sources (such as lead acid batteries. photovoltaic solar panels, wind turbines, etc), and may be designed to satisfy different power demands of a system.

Utility scale solar inverters, in particular. convert variable DC output of a photovoltaic (PV) solar panel into a utility frequency AC to provide power to either a commercial electrical grid or a local, off-grid electrical network. Solar inverters are connected to a plurality of photovoltaic cells that provide DC input to the inverter. The inverter comprises at least one DC-to-AC power conversion bridge, associated filter electronics and an AC (output) module. The DC-to-AC power conversion bridge uses a plurality of electronic switches, typically insulated gate bipolar transistors (IGBTs). and diodes to convert the DC input into AC output. For grid-connected inverters providing power to an electricity grid, the AC output is filtered to provide an AC output waveform that is suitable for the grid. Furthermore, solar power inverters have special functions adapted for use with photovoltaic arrays. including maximum power point tracking and anti-islanding protection.

A sine wave inverter produces a multiple-step sinusoidal AC waveform, although in most cases the output is a choppy or rough approximation of a sine wave, rather than a smooth sine wave. As a substitute for standard AC line power, power inverter devices approximate a sine wave output because many electrical products are engineered to work best with a sine wave AC power source. Further, grid-connected inverters are designed to feed power into the electric power distribution system. They transfer synchronously with the line, and should have as little harmonic content as possible.

The output from an inverter can be single phase or three-phase. Three-phase inverters are generally used in higher power applications. A basic three-phase inverter consists of three single-phase legs each connected to one of the three load terminals. The operation of the three phase legs is coordinated so that one operates at each 120 degree point of the fundamental output waveform. Certain harmonics are eliminated and other harmonics can be removed by further processing.

As shown in FIG. 1, an LC filter comprising one or more inductor and capacitor can be used to smooth the AC waveform from a single phase inverter (as shown in FIG. 1). Such low-pass filters allow the fundamental component of the waveform to pass to the output while limiting the passage of harmonic components. LC filters may similarly be used in connection with a three phase inverter, with an LC filter applied to each output phase of the inverter.

When two or more inverters are connected in parallel, their switching times (single phase or 3-phase) can be synchronized or can be offset relative to one another in an "interleaved" configuration. Interleaving is implemented by phase-shifting the switching times of each inverter by a unique multiple of $360°/n$, where n is the number of inverters. The switching of the multiple inverters is thereby staggered, and the overall switching frequency may thereby be increased.

Interleaving can result in the cancellation of higher order harmonics and a reduction in distortion. Also, the higher frequency noise reduces the size of the inverter AC output filters that are needed. Parallel interleaved three-phase inverters can provide significant cost reductions while improving system reliability and efficiency. FIG. 2 shows two 3-phase DC-AC inverters connected in parallel, with output LC filters.

Interleaved converters are sometimes magnetically coupled with a coupling inductor, and then share the same output filter. The coupling combines high frequency components (which may be interleaved) and may thereby reduce ripple. FIG. 3 shows a pair of inverters (bridges) magnetically coupled via a coupling inductor which is connected to a shared LC filter. With this arrangement the combined current from bridge 1 and bridge 2 passes through the output filter inductor.

SUMMARY

Particularly for large scale inverter systems, AC filters required to smooth out the unacceptably rough AC power waveform of the inverters would conventionally be large and costly in order to handle the level of power and power quality required. In accordance with principles of the present invention, some embodiments provide for two or more inverters to be connected in parallel, in an extremely compact configuration, with efficient use of magnetic inductor material (thereby reducing cost). These embodiments may drastically reduce the overall AC filter size and cost, and can provide a filtered AC output quality suitable for the grid.

According to one aspect, a power electronics system is provided that includes a first inverter configured to receive direct current (DC) power from a power source, a second inverter configured to receive DC power from the power source, a first output inductor connected in series to an alternating current (AC) output of the first inverter, a second output inductor connected in series to an AC output of the second inverter, a coupling inductor configured to receive current from the first output inductor and the second output inductor, and an AC power output to provide current from the coupling inductor.

Some embodiments also include a control system configured to provide a control signal associated with a disturbance frequency, determine an amplitude of oscillation in an output power of the AC power output, wherein the oscillation is caused by the disturbance frequency, detect an islanding condition, if the amplitude of oscillation is below a threshold, and disconnect the grid from the AC power output if the islanding condition is detected.

In some embodiments, the coupling inductor includes a coil winding around a coupled core and a self-inductance core. In further embodiments, the coil winding includes a series of elongated turns.

According to another aspect, power electronics system is provided that includes a first multi-phase inverter configured to receive direct current (DC) power from a power source, a second multi-phase inverter configured to receive DC power from the power source, a first plurality of output inductors, each of the first plurality of output inductors connected in series to an output phase of the first multi-phase inverter, a second plurality of output inductors, each of the second plurality of output inductors connected in series to an output phase of the second multi-phase inverter, a plurality of coupling inductors, each of the plurality of coupling inductors configured to receive current from a respective output inductor of the first plurality of output inductors and a respective output inductor of the second plurality of output inductors, and a multi-phase alternating current (AC) power output to provide current from the plurality of coupling inductors.

Some embodiments also include a control system configured to provide a control signal associated with a disturbance frequency, determine an amplitude of oscillation in an output power of the AC power output, wherein the oscillation is caused by the disturbance frequency, detect an islanding condition, if the amplitude of oscillation is below a threshold, and disconnect the grid from the AC power output if the islanding condition is detected.

In some embodiments, the coupling inductor includes a coil winding around a coupled core and a self-inductance core. In further embodiments, the coil winding includes a series of elongated turns.

According another aspect, an inductor coil winding is provided that includes a first terminal, a series of concentric turns in a first plane, the series of concentric turns leading in from the first terminal and having a diameter allowing for an opening within the series of concentric turns, a series of elongated turns in a second plane, the series of elongated turns leading in from the series of concentric turns and having a length greater than the diameter of the series of concentric turns, and allowing for an opening within the series of elongated turns, and a second terminal, the second terminal leading out form the series of elongated turns.

According to some embodiments, the series of concentric turns provides main inductance.

According to some embodiments, the series of elongated turns provides coupled inductance.

According to some embodiments, the first terminal is an input terminal electrically connected to an output of an inverter to receive current from the inverter.

Some embodiments also include a self-inductance core in the opening within the series of concentric turns and a coupled core in the opening within the series of elongated turns, the coupled core configured to provide a magnetic coupling to another inductor coil winding.

According to another aspect, a filter assembly is provided that includes a first self-inductance core, a second self-inductance core, a coupler core, a first plurality of inductor coil windings, each of the first plurality of inductor coil windings having a series of first turns around the first self-inductance core, and a series of second turns around the first self-inductance core and the coupler core, and a second plurality of inductor coil windings, each of the second plurality of inductor coil windings having a series of first turns around the second self-inductance core, and a series of second turns around the second self-inductance core and the coupler core.

In certain embodiments, the first self-inductance core, the second self-inductance core, and the coupler core each include three limbs, one limb for each of three phases.

In some embodiments, the first turns of each of the first plurality of inductor coil windings are concentric turns and the first turns of each of the second plurality of inductor coil windings are concentric turns.

In some embodiments, the second turns of each of the first plurality of inductor coil windings are elongated turns and the second turns of each of the second plurality of inductor coil windings are elongated turns.

According to certain embodiments, the first plurality of inductor coil windings is configured to electrically connect to a first inverter at a first terminal to receive an alternating current output from the first inverter and the second plurality of inductor coil windings is configured to electrically connect to a second inverter at a second terminal to receive an alternating current output from the second inverter.

In some further embodiments, the first plurality of inductor coil windings is electrically connected to the second plurality of inductor coil windings at a third terminal configured to provide a combined alternating current from the first and second inverter.

Certain embodiments also include a plurality of thermal plates interspersed among the first and second plurality of inductor coil windings and configured to remove thermal energy from the first and second plurality of inductor coil windings.

In various embodiments in accordance with principles of the present invention, a power electronics system comprises a first inverter configured to receive DC power from a power source, a second inverter configured to receive DC power from the power source, a first output inductor connected in series to an output of the first inverter, a second output inductor connected in series to an output of the second inverter, a coupling inductor configured to receive current from the first output inductor and the second output inductor, and an AC power output.

In other embodiments consistent with principles of the invention, a power electronics system comprises a first multi-phase inverter configured to receive DC power from a power source, a second multi-phase inverter configured to receive DC power from the power source, a first plurality of output inductors, each output inductor connected in series to an output phase of the first multi-phase inverter, a second plurality of output inductors, each output inductor connected in series to an output phase of the second multi-phase inverter, a plurality of coupling inductors configured to receive current from an output inductor of the first plurality of output inductors and a output inductor of the second plurality of output inductors having a corresponding phase, and a multi-phase AC power output.

Other embodiments of the power electronic systems further comprise a control system configured to provide a control signal associated with a disturbance frequency, determine an amplitude of oscillation in an output power of the AC power output, wherein the oscillation is caused by the disturbance frequency, detect an islanding condition, if the amplitude of oscillation is below a threshold, and disconnect the grid from the AC power output if the islanding condition is detected.

In accordance with principles of the invention, an inductor coil winding comprises an input with a series of concentric turns in a first plane, the concentric turns having a diameter allowing for an opening within the series of concentric turns that provide main inductance to a filter system. The concentric turns lead into a series of elongated turns in a second plane, the series of elongated turns leading in from the series of concentric turns and having a length greater than the diameter of the concentric turns of the series of concentric turns, and allowing for an opening within the series of elongated turns. The opening within the series of elongated turns being larger than the opening of the within the series of concentric turns to accommodate for a shared inductance. The series of elongated turns leads to an output of the inductor coil.

Other embodiments of the present invention provide a filter assembly comprising a first self-inductance core, a second self-inductance core, and a coupler core. The embodiments further comprise a first plurality of inductor coil windings, each inductor coil winding having an input leading to a series of concentric turns in a first plane, the concentric turns having a diameter allowing for an opening within the series of concentric turns. The concentric turns lead to a series of elongated turns in a second plane, the series of elongated turns leading in from the series of concentric turns and having a length greater than the diameter of the concentric turns of the series of concentric turns, and allowing for an opening within the series of elongated turns an output. The first plurality of inductor coil windings are arranged such that the opening within the series of concentric turns of the inductor coil windings accommodate the first self-inductance core, and the opening within the series of elongated turns of the inductor coil windings accommodate the first self-inductance core and the coupler core. A second group of similar inductor coils are arranged such that the opening within the series of concentric turns of the inductor coil windings accommodate the second self-inductance core, and the opening within the series of elongated turns of the inductor coil windings accommodate the second self-inductance core and the coupler core. In embodiments consistent with principles of the present invention, self-inductance cores and a coupled core of a filter assembly may be provided for three phases in a fully integrated implementation.

Still other aspects, examples, and advantages are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. In the figures, identical or nearly identical components illustrated in various figures may be represented by like numerals. For purposes of clarity, not every component may be labeled in every figure. In the figures.

DETAILED DESCRIPTION

Aspects and embodiments provide inductor arrangements to couple two or more inverters in parallel, in an extremely compact configuration, with efficient use of magnetic inductor material (thereby reducing cost). Embodiments in accordance with principles of the invention can drastically reduce the overall AC filter size and cost, and can provide a filtered AC output quality suitable for the grid. A cooling system may be mechanically integrated into the compact AC filter module for thermal management in some embodiments.

It is to be appreciated that examples of the methods, systems, and apparatuses discussed herein are not limited in application to the details of construction and the arrangement of components set forth in the following description or illustrated in the accompanying drawings. The methods, systems, and apparatuses are capable of implementation in other examples and of being practiced or of being carried out in various ways. Examples of specific implementations are provided herein for illustrative purposes only and are not intended to be limiting. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
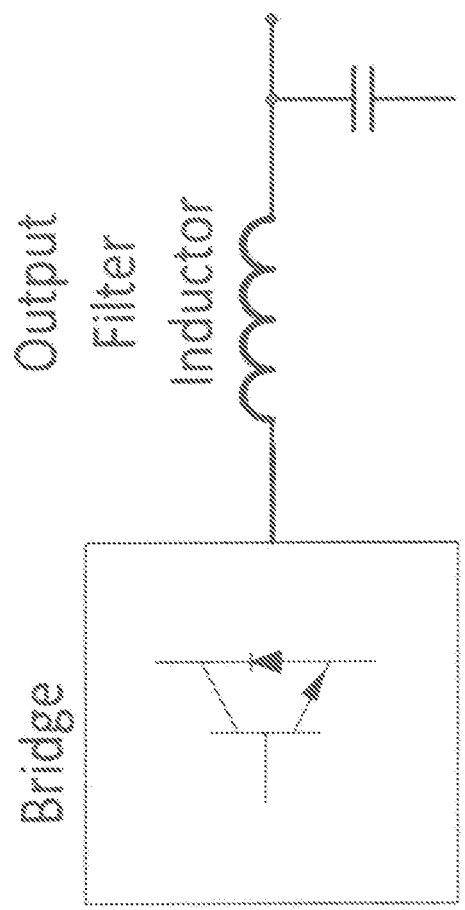
FIG. 1 is a schematic diagram of single phase power conversion bridge with an AC filter.
Figure 2:
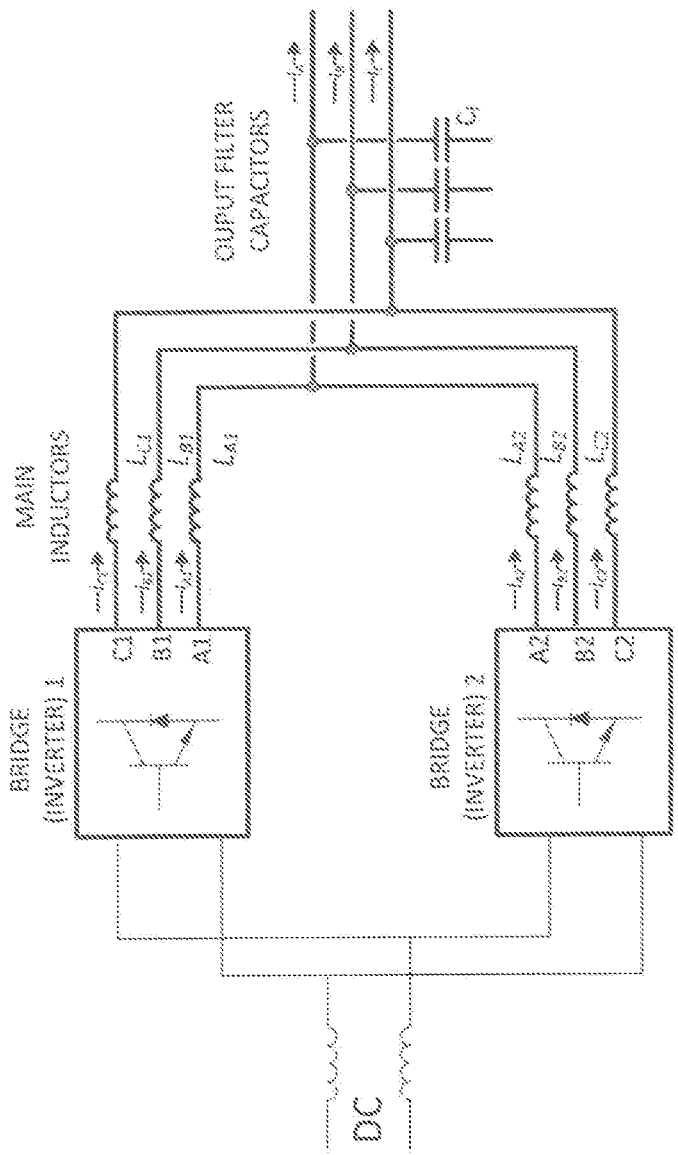
FIG. 2 is a schematic diagram of two three-phase power bridges connected in parallel employing output AC filters.
Figure 3:
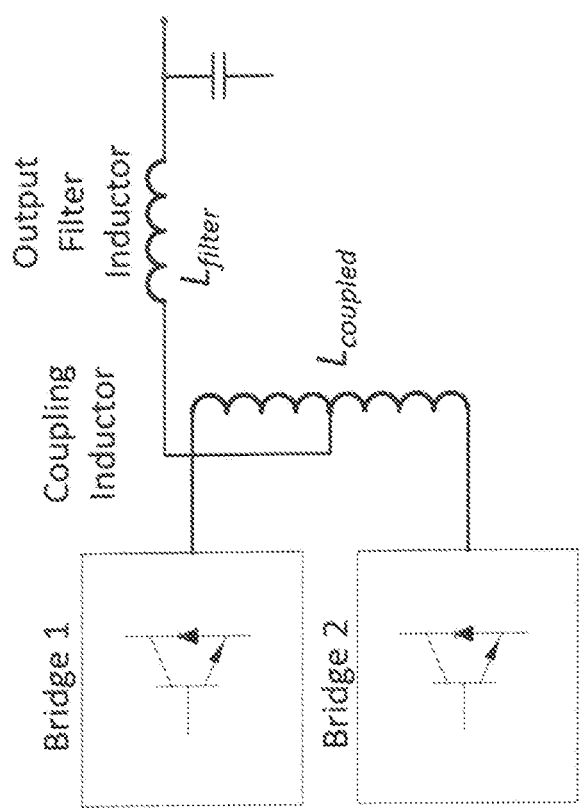
FIG. 3 is a schematic diagram of two single phase power conversion bridges coupled via a coupling inductor with a shared output AC filter.
Figure 4:
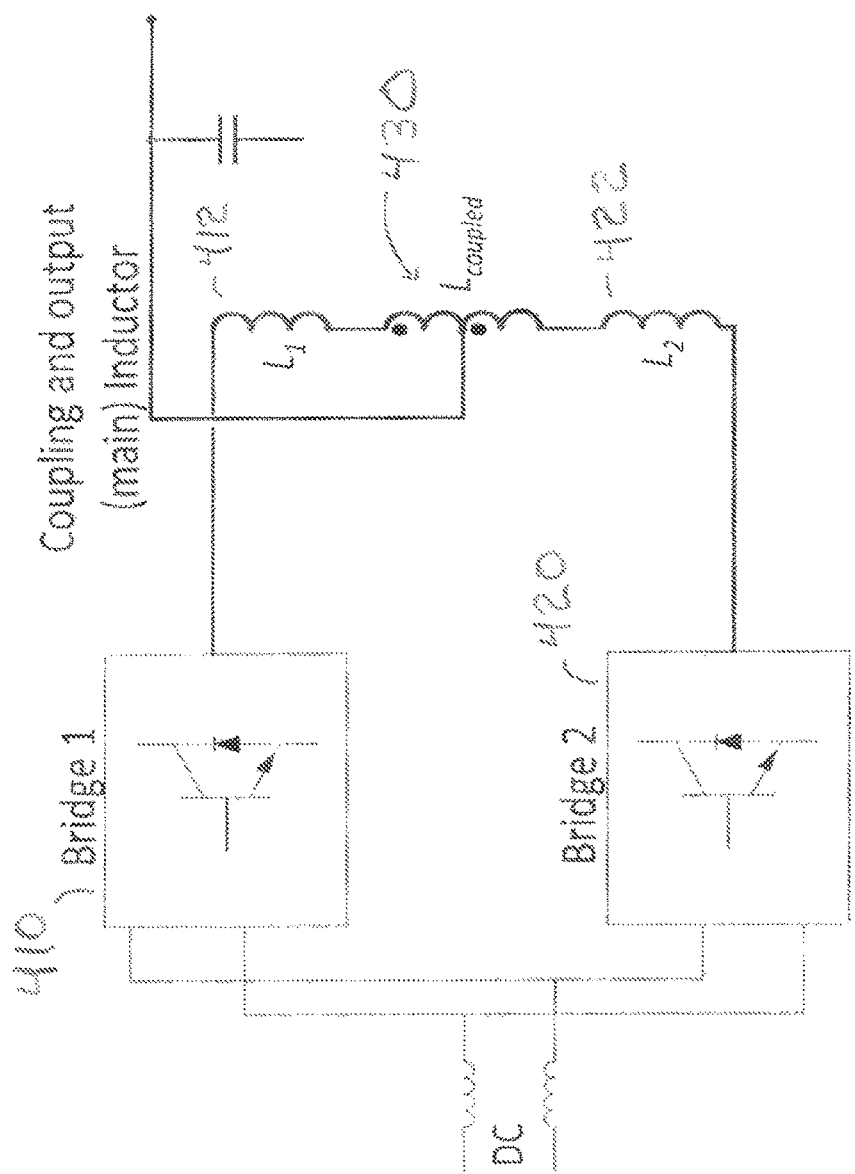
FIG. 4 is a schematic diagram of two single phase power conversion bridges, with each bridge having an output AC filter, connected in parallel and coupled via a coupling inductor in accordance with principles of the invention.

In an embodiment according to principles of the present invention, FIG. 4 illustrates an example of two single-phase inverters 410, 420 (bridge 1 and bridge 2) connected in parallel, each inverter 410, 420 having a corresponding output inductor 412, 422 (L1 and L2), respectively providing self-inductance. The outputs are then magnetically coupled via a coupled inductor 430 ($L_{coupled}$). With this arrangement, there is half as much current passing through each of inductors L1 and L2, as there would be passing through $L_{filter}$ in the conventional filter arrangement of FIG. 3. Thus in the arrangement of FIG. 4 losses may be approximately halved relative to FIG. 3, for the same overall output current, reducing the amount of heat generated and providing more efficient power conversion.

Figure 5:
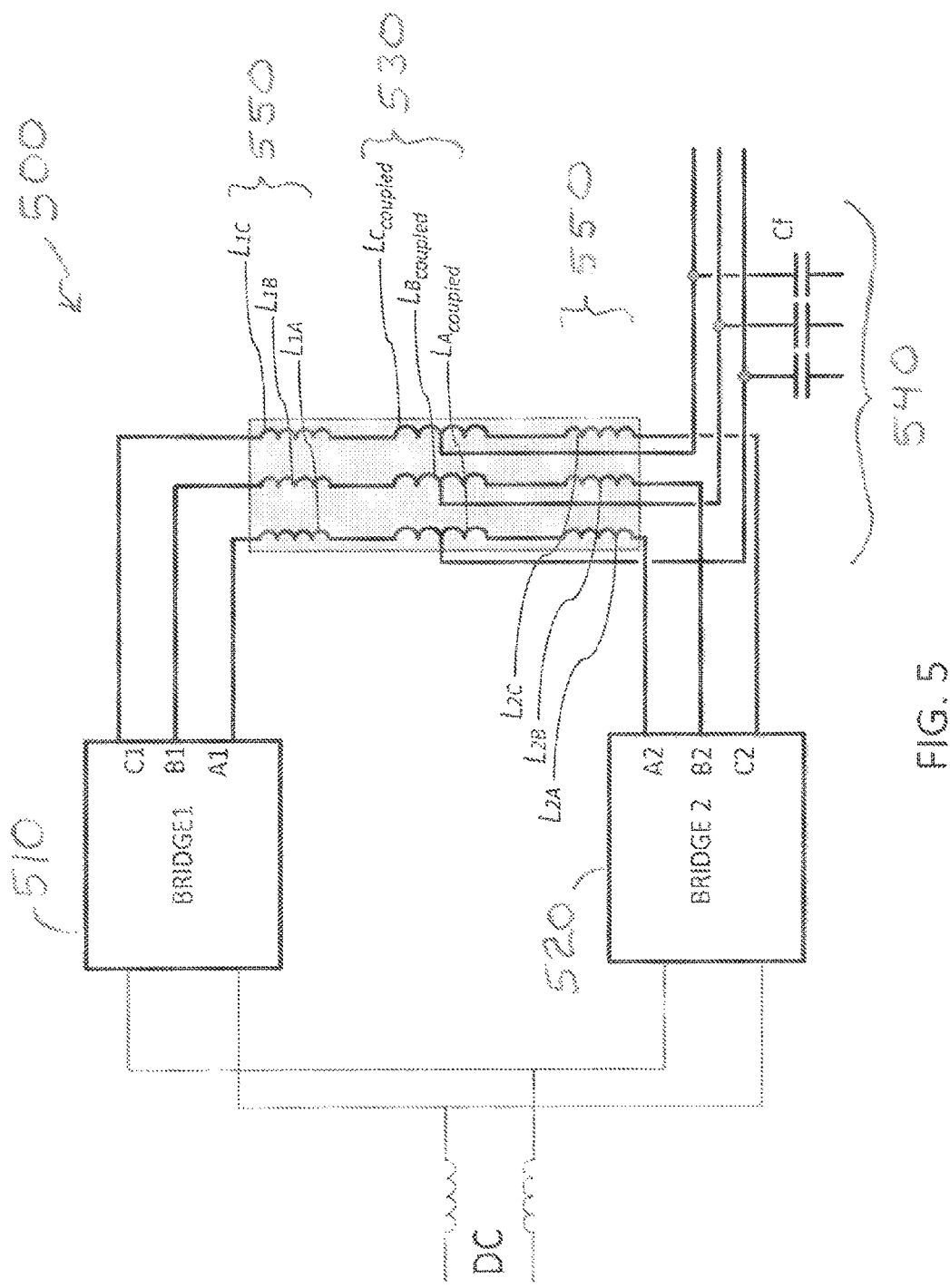
FIG. 5 is a schematic diagram of two three phase power conversion bridges, with each phase of each bridge having an output AC filter, connected in parallel with each phase coupled via coupling inductors in accordance with principles of the invention.

In other embodiments according to principles of the present invention, FIG. 5 shows a solar inverter system 500 of similar arrangement to FIG. 4, but for two 3-phase inverters 510, 520 (bridges) connected in parallel. Corresponding phases (A, B, C) from each of the inverters 510, 520 are coupled via a coupled inductor 530. In some embodiments, the inverters 510, 520 of solar inverter system 500 may be DC-to-AC inverters (or "power conversion bridges"), each rated for up to 1 MW (as 2MW of power cannot be handled by a single inverter). Each inverter produces a 3-phase output. The two bridges are connected in parallel and the 3-phase outputs of the 2 bridges are interleaved (180° out of phase relative to each other). The inverters 510, 520 on their own may produce an unacceptably rough AC power waveform. Therefore, an AC filter module 540, consisting of inductor and capacitor components, is used to smooth the waveform.

To handle the level of power and power quality requirements, an AC filter would conventionally be large and costly. For example, a classical approach to this problem, even after much optimization, requires inductors that cost approximately 9% of the system cost and capacitors that are approximately 2% of the system cost. The inductor used in the classical approach also produces significant energy losses (around 4 kW), which inflates the required cooling system and adds additional cost and volume to the system.

As mentioned above, switching of the two 3-phase inverters 510, 520 in the example system 500 may be interleaved, thereby doubling the switching frequency. This essentially doubles the frequency seen by the inductors and therefore the amount of filtering required is reduced. In various embodiments, for each of the two inverters 510, 520, there is a core for each AC phase that provides self-inductance 550. For each AC phase, there is also a third core that provides a coupled inductance 530 between the inverters 510, 520 (for each phase). Each of the self-inductors 550 is positioned between each inverter 510, 520 and the respective coupled inductor 530, per phase.

The AC filter module 540 thereby includes coupling between inverters and in some implementations also includes coupling between phases.

As discussed above, a solar inverter system may comprise two 3-phase inverters connected in parallel, but a similar approach consistent with principles of the invention can be taken with more than two 3-phase inverters and/or with two or more single phase or other multi phase inverters.

The above-described electrical configurations can be implemented in many different embodiments, not limited to those described in further detail below.

In embodiments according to principles of the invention, the mechanical design of an AC filter module has multiple novel aspects that allow the technology to be practically and commercially realized. Overall the coupled inductor is ⅓ the total mass and ½ the volume of the classical inductors when designed for equivalent losses. This results in a cost reduction of the inductor components. Additional reductions in system cost can be obtained through mechanical integration of cooling, structural features, and size reduction.

In conventional inductor systems, the coils or windings are wrapped around a central core (often a straight cylindrical rod or a continuous loop or ring, doughnut). Embodiments of the present invention involve a unique winding geometry that is particularly suited for use in embodiments of an AC filter module. An example of such a winding is shown in FIG. 6.

The conductive material of an example winding 600 (e.g. copper or aluminum) may have a rectangular cross-section as shown. In various embodiments, the conductive material may be one or more strands, and may be multi-strand transpose wire in certain embodiments, e.g., to achieve additional reduction in losses. The winding 600 is shaped to form a series of concentric turns 610 in a first plane for the main inductance, then transitions to a second plane (parallel to the first) and is formed in to a series of concentric elongated turns 620. The circular opening 612 accommodates a self-inductor core and the elongated opening 622 accommodates a coupled inductor core. The coupled inductor turns 620 also contribute to the self-inductance. In certain embodiments, the winding 600 may be generally coated in an electrically insulating material, such as a plastic, except for the terminals 630.

Figure 6:
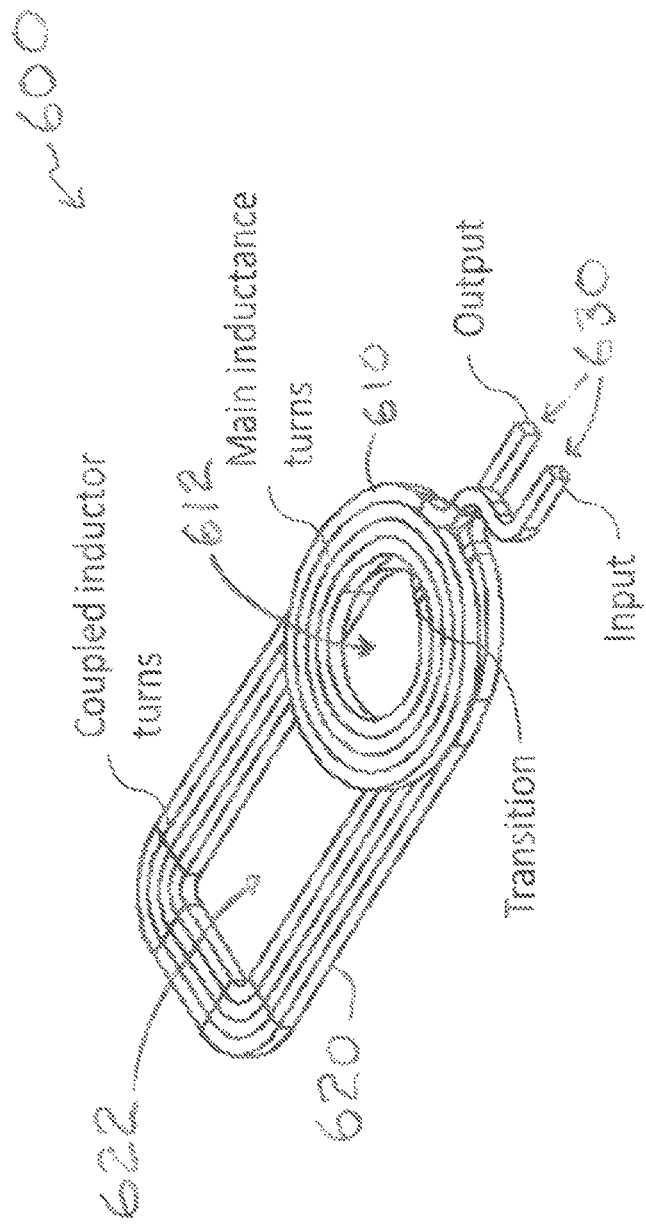
FIG. 6 is a perspective view of an example inductor coil in accordance with principles of the invention.

Various embodiments of winding geometry, with respect to the example illustrated in FIG. 6, offer particular advantages. They are designed to integrate the self and coupled inductor cores, and are designed to stack in a space-efficient manner, with the main inductance turns of one winding in the same plane as the coupled inductance turns of an adjacent winding. The stacks of windings can also be packed together tightly side-by-side because of their quasi-rectangular shape. The flat/planar structure of the windings also allows good thermal contact with thermal plates, such as liquid-cooled thermal plates, which can be interposed between stacked windings, for cooling the assembly (as described in more detail below). Input and output terminals can be conveniently located at almost any desired location around the perimeter of the winding. In conventional windings, one terminal is often located inside the winding where it is less accessible.

Variations on the above winding geometry or quite different winding geometries can be used in various implementations of the present invention. For example, in some variations on the above winding geometry, the cross-section of the winding may be non-rectangular. The number of turns for the main inductance and the coupled inductance can be varied. The shape of the windings need not be as shown. The various winding turns need not be in two planes as shown, e.g., they may be in a single plane or in multiple planes. In other winding geometries, the winding turns may not have a planar-like configuration like the winding of FIG. 6. They may, for example, have a helical structure or a more conventional geometry etc.

Figure 7:
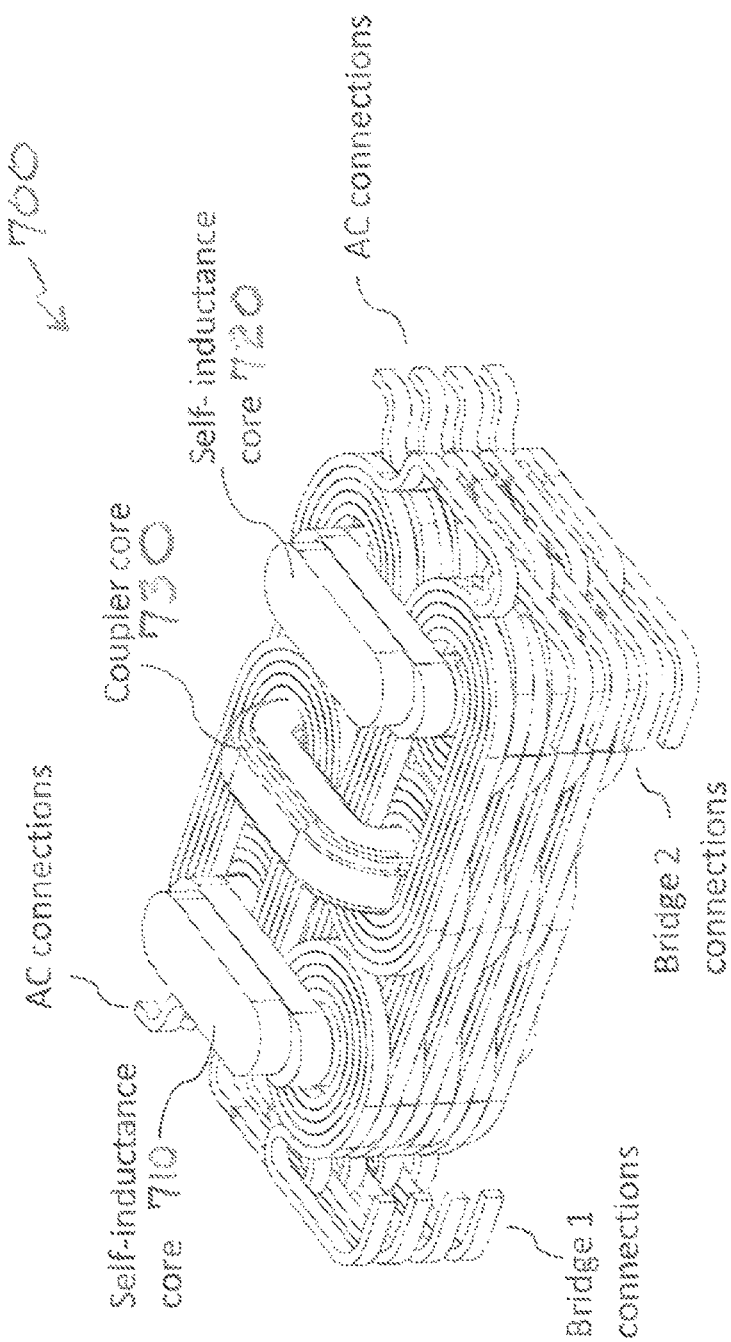
FIG. 7 is a perspective view of an example filter assembly for a single phase output of an inverter pair with connections to each inverter bridge in accordance with principles of the invention.

FIG. 7 shows an example AC filter assembly 700 for single-phase output of an inverter pair with connections to each inverter bridge. The assembly comprises 16 windings similar to those shown in FIG. 6 (with circular openings to accommodate the cores), stacked in two side-by-side stacks of 8. Self-inductance turns of the 8 windings connected to bridge 1 are wound around self-inductance core 710. Similarly, self-inductance turns of the 8 windings connected to bridge 2 are wound around self-inductance core 720. The coupled inductor turns of all 16 windings are wound around the coupler core 730.

The physically interleaved windings stacked on each core are positioned to cancel what could otherwise be massive losses in the coupler core. There are multiple windings in parallel surrounding the various cores, which tends to reduce or minimize current crowding that can occur due to proximity of the windings to the magnetic material (cores) and other conductors (windings).

For a pair of inverters with 3-phase (interleaved) output, three separate mechanical assemblies like that shown in FIG. 7 may be used. In certain embodiments, however, the windings and inductors for all three phases of two or more inverters may be integrated into a single, compact assembly. An example of such an assembly is illustrated in perspective view in FIG. 8. A top view of the same example assembly is illustrated in FIG. 9.

Figure 8:
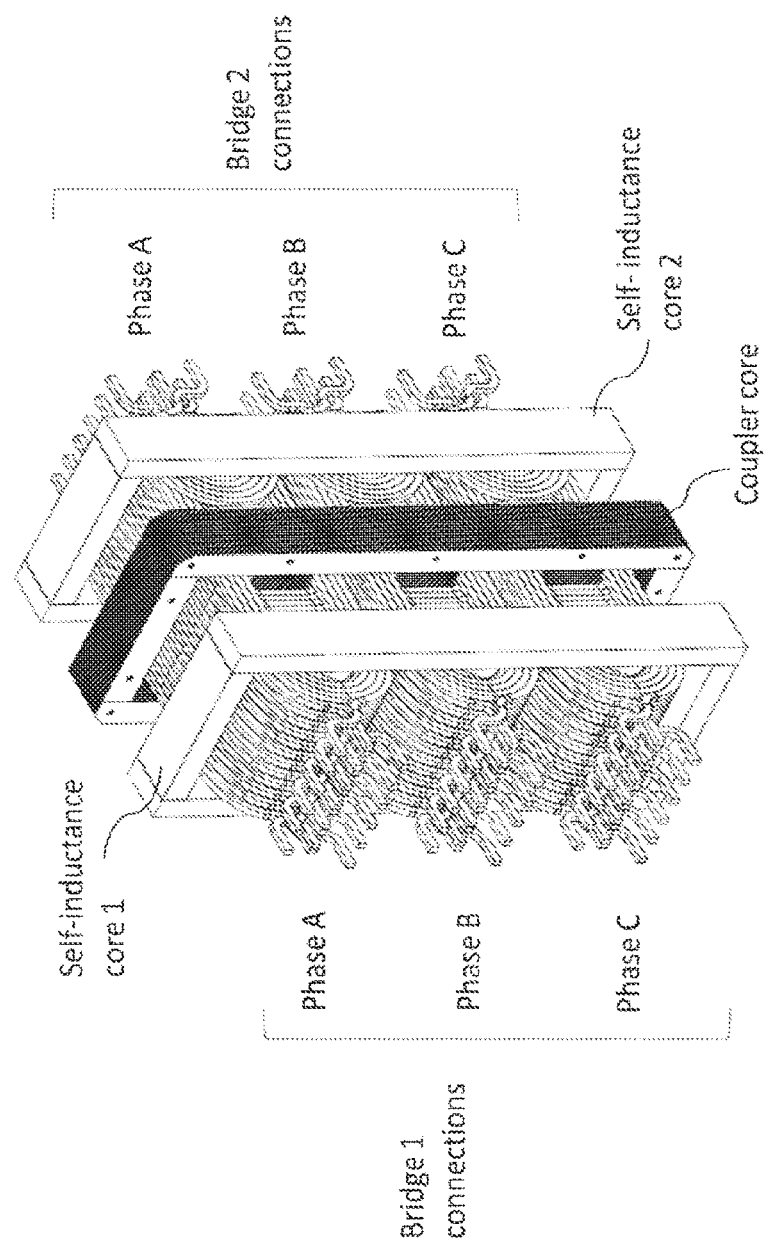
FIG. 8 is a perspective view of an example 3-phase inductor assembly in accordance with principles of the invention.
Figure 9:
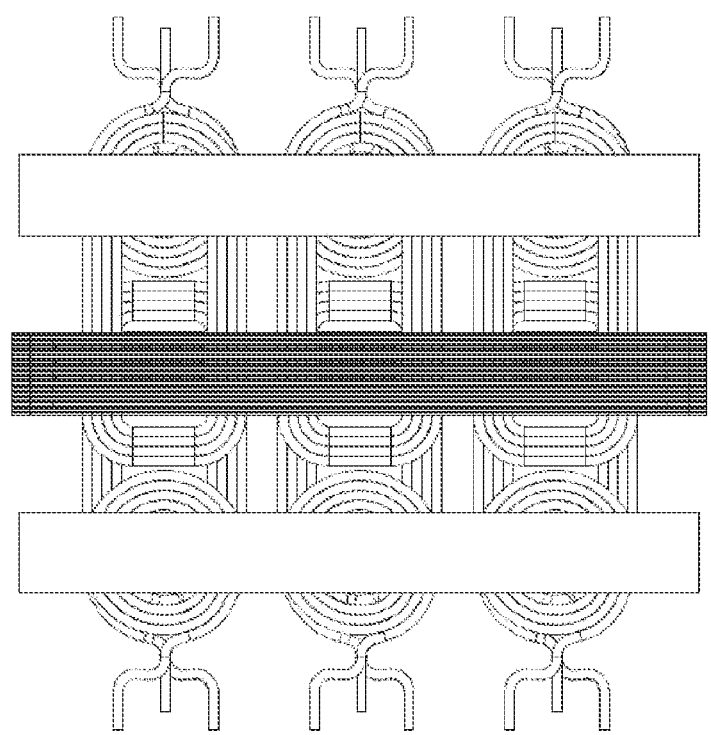
FIG. 9 is a top view of the example 3-phase inductor assembly of FIG. 8.

In the example of FIG. 8, the 1st and 5th limbs of each core are optional, depending on application, and/or the yoke of one or more of the cores may be removed, e.g., in an air core design. For example, a yokeless design for the self-inductor cores is enabled due to the core material magnetic properties and the arrangement of the cores. Such can reduce the core material mass and cost significantly.

The self-inductor cores and coupler cores can be made of any suitable magnetic material. In some embodiments the self-inductor cores are powdered iron or powdered iron alloys, and the coupler cores are pillars or rods made of an amorphous material, with the perimeter constructed from Cold Rolled Grain Oriented laminated steel. Such a composition and construction can improve power losses and dissipation in the magnetic material.

Figure 10:
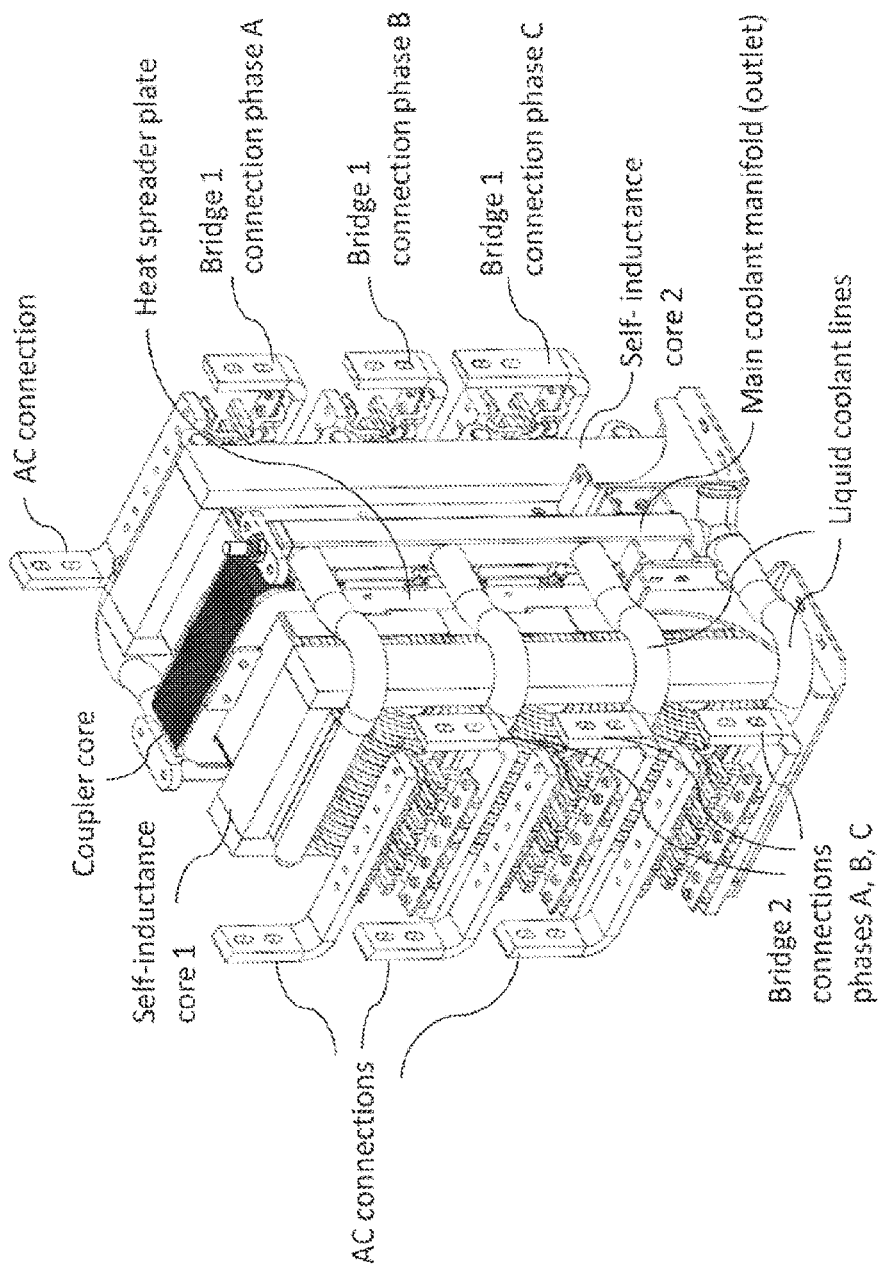
FIG. 10 is a perspective view of the example 3-phase inductor assembly of FIG. 8 including example integrated cooling components.

FIG. 10 shows an example AC filter module for a pair of interleaved 3-phase inverters comprising the assembly of FIG. 8 integrated with a liquid cooling system rack (shown individually in FIG. 11 below). For example, aluminum thermal plates with internal flow channels may be interposed between the phase A/phase B windings and between the phase B/phase C windings, and above the phase A windings and below the phase C windings. Liquid coolant supplied via a main coolant inlet manifold and coolant lines, may be circulated through the plates, in parallel, to cool the electrical and magnetic components, and then directed via corresponding outlet lines and an outlet manifold to an air-cooled heat exchanger. A pair of solid aluminum heat spreader plates may be included to help dissipate heat generated deep inside the module, near the coupler core, for example.

As mentioned above, in the assemblies shown in FIGS. 8-10, windings are tightly packed close together, reducing the size of the cores and the amount of magnetic material that is needed, and thereby reducing losses. Magnetic material in the pairs of phases may be shared in some embodiments. Embodiments of an inductor assembly, such as the example assembly shown in FIGS. 8-10, including a compact arrangement of inductor windings for three phases (e.g., as compared to three separate assemblies like that assembly shown in FIG. 7), may provide improved compensation and cancellation of noise between coils of the assembly.

In some embodiments, an assembly or module as shown in FIGS. 8-10 may be potted, e.g., in high temperature, thermally conductive, electrically insulating material.

Figure 11:
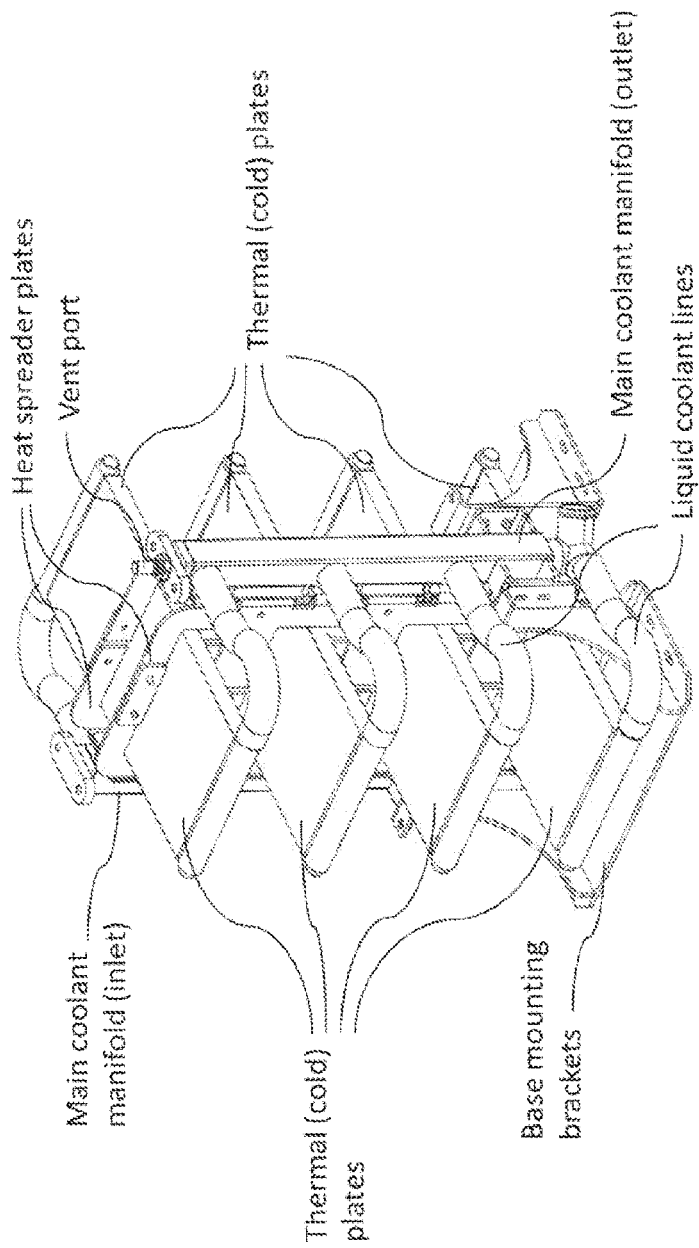
FIG. 11 is a perspective view of the example cooling components of FIG. 10, apart from the example 3-phase inductor assembly.

FIG. 11 illustrates the example cooling system components of the module shown in FIG. 10. The example cooling system includes liquid coolant that is distributed through coolant lines to various thermal plates to remove heat generated from the inductor coils and electrical components.

Embodiments of the present invention provide a number of advantages, including the reduction of an AC filter size and cost, through use of a compact configuration, with efficient use of magnetic inductor and conductor materials. Examples and embodiments of AC filter/inductor assemblies described herein have the effect of providing an increased power density. In addition, they may provide reduced losses due to lower current from the self-inductors being "upstream" of the coupled inductor, and reduced losses due to the interleaved physical arrangement of the windings on the coupler cores. The reduced losses result in less heat generation, and reduced requirement for cooling. The design of the cores and windings provide for simple assembly, supporting manufacturing feasibility. Further, the design allows for the use of liquid cooling of a filter/inductor, which is generally more cost-efficient than air-cooling, and allows for greater control or optimization of the degree of thermal transfer.

In various embodiments, windings, arrangements, assemblies, and modules in accord with aspects of those illustrated in FIGS. 4-10 may be beneficially applied to provide electrical filtering to any of numerous power converter applications, including those of solar inverters as described herein, but also of DC-to-DC converters, AC-to-DC converters, and other DC-to-AC converters for applications other than solar. Such arrangements may provide compact and efficient filtering to remove high frequency components from an electrical waveform at inputs and/or outputs of various power converters. Such arrangements may also be beneficially adapted to differing scale of power conversion equipment than those discussed herein. For example, power factor correction (PFC) equipment, uninterruptible power supply (UPS) equipment, and the like.

Having described above several aspects of at least one embodiment, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only, and the scope of the invention should be determined from proper construction of the appended claims, and their equivalents.

What is claimed is:

1. A power electronics system, comprising:
a first inverter configured to receive direct current (DC) power from a power source;
a second inverter configured to receive DC power from the power source;
a first output inductor connected in series to an alternating current (AC) output of the first inverter,
a second output inductor connected in series to an AC output of the second inverter;
a coupling inductor configured to receive current from the first output inductor and the second output inductor, wherein the coupling inductor includes a coil winding around a coupled core and a self-inductance core; and
an AC power output to provide current from the coupling inductor.

2. The power electronic system of claim 1 wherein the coil winding includes a series of elongated turns.

3. A power electronics system, comprising:
a first multi-phase inverter configured to receive direct current (DC) power from a power source;
a second multi-phase inverter configured to receive DC power from the power source;
a first plurality of output inductors, each of the first plurality of output inductors connected in series to an output phase of the first multi-phase inverter,
a second plurality of output inductors, each of the second plurality of output inductors connected in series to an output phase of the second multi-phase inverter;
a plurality of coupling inductors, each of the plurality of coupling inductors configured to receive current from a respective output inductor of the first plurality of output inductors and a respective output inductor of the second plurality of output inductors, wherein each of the plurality of coupling inductors includes a coil winding around a coupled core and a self-inductance core; and
a multi-phase alternating current (AC) power output to provide current from the plurality of coupling inductors.

4. The power electronic system of claim 3, wherein the coil winding includes a series of elongated turns.

5. A An inductor coil winding comprising:
a first terminal;
a series of concentric turns in a first plane, the series of concentric turns leading in from the first terminal and having a diameter allowing for an opening within the series of concentric turns;
a series of elongated turns in a second plane, the series of elongated turns leading in from the series of concentric turns and having a length greater than the diameter of the series of concentric turns, and allowing for an opening within the series of elongated turns; and
a second terminal, the second terminal leading out form the series of elongated turns.

6. The inductor coil winding of claim 5 wherein the series of concentric turns provides main inductance.

7. The inductor coil winding of claim 6 wherein the series of elongated turns provides coupled inductance.

8. The inductor coil winding of claim 7 wherein the first terminal is an input terminal electrically connected to an output of an inverter to receive current from the inverter.

9. The inductor coil winding of claim 5 further comprising a self-inductance core in the opening within the series of concentric turns and a coupled core in the opening within the series of elongated turns, the coupled core configured to provide a magnetic coupling to another inductor coil winding.

10. A filter assembly comprising:
a first self-inductance core;
a second self-inductance core;
a coupler core;
a first plurality of inductor coil windings, each of the first plurality of inductor coil windings having a series of first turns around the first self-inductance core, and a series of second turns around the first self-inductance core and the coupler core; and
a second plurality of inductor coil windings, each of the second plurality of inductor coil windings having a series of first turns around the second self-inductance core, and a series of second turns around the second self-inductance core and the coupler core.

11. The filter assembly of claim 10 wherein the first self-inductance core, the second self-inductance core, and the coupler core each include three limbs, one limb for each of three phases.

12. A The filter assembly of claim 10 wherein the first turns of each of the first plurality of inductor coil windings are concentric turns and the first turns of each of the second plurality of inductor coil windings are concentric turns.

13. The filter assembly of claim 12 wherein the second turns of each of the first plurality of inductor coil windings are elongated turns and the second turns of each of the second plurality of inductor coil windings are elongated turns.

14. The filter assembly of claim 10 wherein the first plurality of inductor coil windings is configured to electrically connect to a first inverter at a first terminal to receive an alternating current output from the first inverter and the second plurality of inductor coil windings is configured to electrically connect to a second inverter at a second terminal to receive an alternating current output from the second inverter.

15. The filter assembly of claim 14 wherein the first plurality of inductor coil windings is electrically connected to the second plurality of inductor coil windings at a third terminal configured to provide a combined alternating current from the first and second inverter.

16. The filter assembly of claim 10 further comprising a plurality of thermal plates interspersed among the first and second plurality of inductor coil windings and configured to remove thermal energy from the first and second plurality of inductor coil windings.

* * * * *